US009157662B2

(12) United States Patent
Kim et al.

(10) Patent No.: US 9,157,662 B2
(45) Date of Patent: Oct. 13, 2015

(54) PHOTOVOLTAIC MODULE

(75) Inventors: Hongbum Kim, Changwon-si (KR);
Hayoung Park, Changwon-si (KR);
Yongwoo Choi, Changwon-si (KR)

(73) Assignee: LG ELECTRONICS INC., Seoul (KR)

( * ) Notice: Subject to any disclaimer, the term of this patent is extended or adjusted under 35 U.S.C. 154(b) by 383 days.

(21) Appl. No.: 13/155,899

(22) Filed: Jun. 8, 2011

(65) Prior Publication Data

US 2011/0232757 A1 Sep. 29, 2011

(30) Foreign Application Priority Data

Sep. 20, 2010 (KR) ........................ 10-2010-0092609

(51) Int. Cl.
*F24J 2/46* (2006.01)
*F24J 2/52* (2006.01)
*H02S 30/10* (2014.01)

(52) U.S. Cl.
CPC ............... *F24J 2/4614* (2013.01); *F24J 2/464* (2013.01); *F24J 2/4612* (2013.01); *F24J 2/5211* (2013.01); *H02S 30/10* (2014.12); *Y02E 10/40* (2013.01)

(58) Field of Classification Search
CPC ........ E04D 13/00; F24J 2/4612; F24J 2/1614; F24J 2/5211; H02S 30/10
USPC ................... 52/173.3, 302.1–302.7; 136/259
See application file for complete search history.

(56) References Cited

U.S. PATENT DOCUMENTS

| 6,453,629 | B1* | 9/2002 | Nakazima et al. | ............ 52/173.3 |
| 6,528,718 | B2* | 3/2003 | Yoda et al. | ..................... 136/251 |
| 7,487,771 | B1 | 2/2009 | Eiffert et al. | |
| 7,956,279 | B2* | 6/2011 | Morita et al. | ................ 136/251 |
| 8,479,458 | B2* | 7/2013 | Morita et al. | ................ 52/173.3 |
| 2002/0029799 | A1 | 3/2002 | Yoda et al. | |
| 2011/0232757 | A1* | 9/2011 | Kim et al. | ..................... 136/259 |

FOREIGN PATENT DOCUMENTS

| DE | 2848946 A1 | 6/1980 |
| EP | 1860705 | 11/2007 |
| EP | 2068374 | 6/2009 |
| JP | 2000-277781 A | 10/2000 |
| JP | 2002314113 | 10/2002 |
| JP | 2006198468 | 8/2006 |
| JP | 2007224538 | 9/2007 |
| WO | WO 2008/108909 | 9/2008 |
| WO | WO 2011/065542 | 6/2011 |

* cited by examiner

*Primary Examiner* — Andrew J Triggs
(74) *Attorney, Agent, or Firm* — Dentons US LLP (57) ABSTRACT

A photovoltaic module has an opening through which rainwater and waste matter are discharged. The photovoltaic module includes a front substrate, a rear substrate disposed opposite to the front substrate, a solar cell disposed between the front substrate and the rear substrate, and a frame surrounding edges of the front substrate and the rear substrate, the frame being formed or substantially formed in a rectangular shape, the frame having at least one opening formed at a short side or long side thereof.

16 Claims, 9 Drawing Sheets

PHOTOVOLTAIC MODULE

This application claims the priority benefit of Korean Patent Application No. 10-2010-0092609, filed on Sep. 20, 2010 in the Korean Intellectual Property Office, the disclosure of which is incorporated herein by reference.

BACKGROUND

1. Field of the Disclosure

The present disclosure relates to a photovoltaic module, and more particularly to a photovoltaic module having an opening through which rainwater and waste matter are discharged.

2. Background

In recent years, exhaustion of existing energy resources, such as petroleum and coal, has been forecasted with the result that interest in alternative energy resources substituting for the existing energy resources has risen. Among such alternative energy resources is a solar cell that directly converts solar light energy into electrical energy using a semiconductor device, which is in the spotlight as a next-generation cell.

A solar cell is a device that converts light energy into electric energy using a photovoltaic effect. The solar cell may be classified as a crystalline silicon solar cell, a thin film solar cell, a dye-sensitized solar cell, or an organic solar cell.

SUMMARY

A photovoltaic module including solar cells, which are modularized to be installed outdoors, is installed outdoors, with the result that the photovoltaic module may be contaminated due to rainwater or waste matter.

Therefore, one object is to provide a photovoltaic module from which rainwater or waste matter may be efficiently discharged.

Another object is to provide a photovoltaic module having a drainage hole, through which rainwater or waste matter may be discharged, formed through a simple process.

The objects described above are exemplary and other objects that have not been mentioned above may become evident to those skilled in the art from the following description.

In accordance with one aspect, the above and other objects may be accomplished by the provision of a photovoltaic module including a front substrate, a rear substrate disposed opposite to the front substrate, a solar cell disposed between the front substrate and the rear substrate, and a frame surrounding edges of the front substrate and the rear substrate, the frame being formed or substantially formed in a rectangular shape, the frame having at least one opening formed at a short side or long side thereof.

Details of other embodiments are included in the following description and the accompanying drawings.

BRIEF DESCRIPTION OF THE DRAWINGS

The above and other objects, features and advantages may be more clearly understood from the following detailed description taken in conjunction with the accompanying drawings, in which.

DETAILED DESCRIPTION OF THE PREFERRED EMBODIMENTS

Advantages and features and the way of achieving them may become apparent with reference to embodiments described below in conjunction with the accompanying drawings. However, the present invention is not limited to embodiments disclosed in the following description but may be embodied in various different forms. Throughout the specification, the same components are denoted by the same reference numerals.

Hereinafter, embodiments of the present invention will be described in detail with reference to the accompanying drawings illustrating photovoltaic modules.

Figure 1:
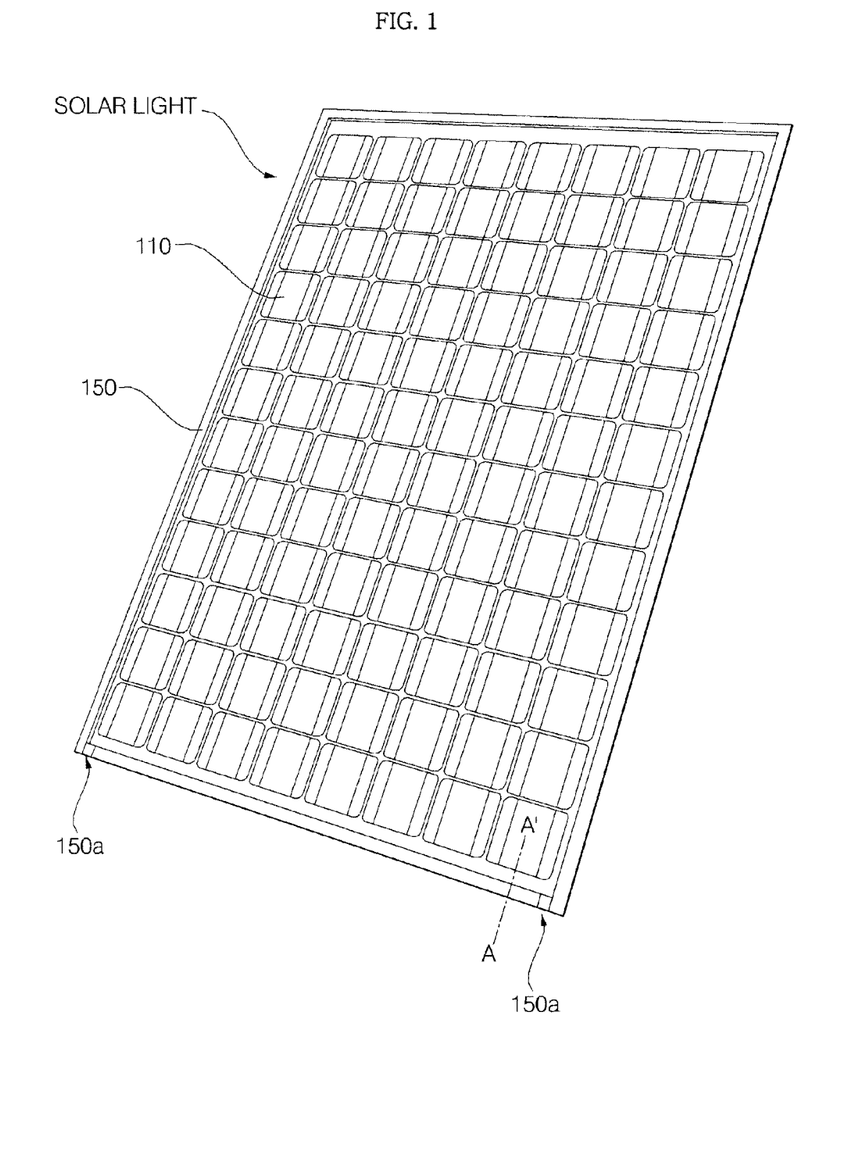
FIG. 1 is a perspective view illustrating a photovoltaic module according to an embodiment of the present invention.
Figure 2:
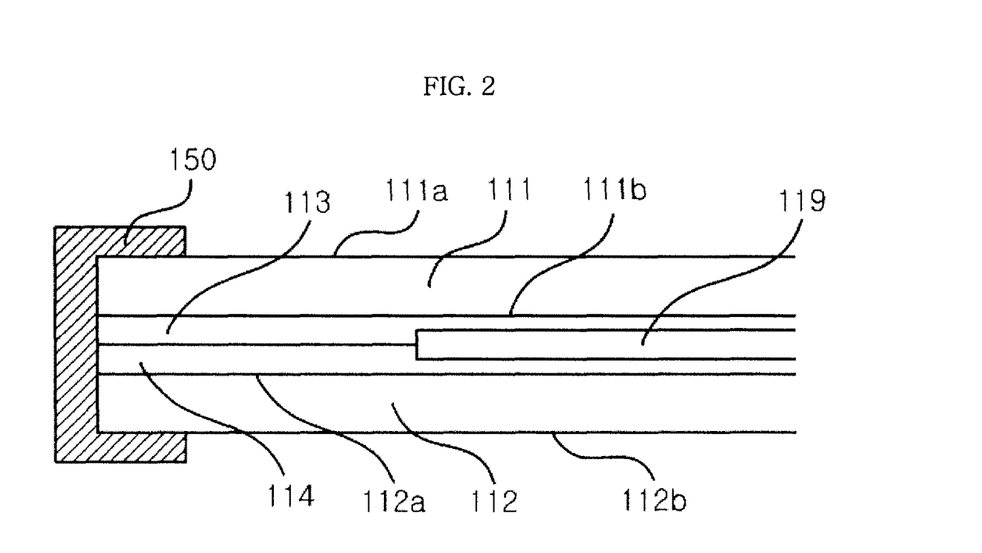
FIG. 2 is a sectional view taken along line A-A' of FIG. 1.

FIG. 1 is a perspective view illustrating a photovoltaic module according to an embodiment of the present invention, and FIG. 2 is a sectional view taken along line A-A' of FIG. 1.

In this embodiment of the present invention, the photovoltaic module includes a rectangular photovoltaic panel 110 and a frame 150 surrounding the edge of the photovoltaic panel 110.

The photovoltaic panel 110 generates photovoltaic power from solar light incident thereupon. The photovoltaic panel 110 may be formed or substantially formed in a rectangular shape. In other embodiments, the photovoltaic panel 110 may be formed or substantially formed in a polygonal shape.

The photovoltaic panel 110 includes a light receiving surface upon which solar light is incident and a back surface which is opposite to the light receiving surface. The photovoltaic panel 110 is installed inclined toward the sun so that the light receiving surface of the photovoltaic panel 110 is perpendicular or substantially perpendicular to solar light. In other embodiments, the inclination of the photovoltaic panel 110 may be adjusted so that the light receiving surface of the photovoltaic panel 110 is directed toward the sun according to the position of the sun.

Referring to FIG. 2, the photovoltaic panel 110 includes a rectangular front substrate 111 upon which solar light is incident, a solar cell 119 stacked on the front substrate 111 for generating photovoltaic power from the solar light incident upon the front substrate 111, and a rectangular rear substrate 112 stacked on the solar cell 119, the rear substrate 112 corresponding to the front substrate 111.

The solar cell 119 is a semiconductor device which converts solar energy into electrical energy. For example, the solar cell 119 may be a crystalline silicon solar cell. In this embodiment, the solar cell 119 is disposed between the front substrate 111 and the rear substrate 112.

The front substrate 111 is a layer for achieving efficient incidence of solar light and for protecting the solar cell 119. Preferably, the front substrate 111 is made of low-iron tempered glass which exhibits a high incidence rate of solar light and is capable of protecting the solar cell 119. The front substrate 111 may be processed so that the front substrate 111 exhibits a high optical transmittance and a low optical reflection loss at the surface thereof. The front substrate 111 includes a light receiving surface 111a exposed to the outside so that solar light is incident upon the light receiving surface 111a and a back surface 111b opposite to the light receiving surface 111a.

The front substrate 111 may be formed or substantially formed in a rectangular shape. That is, the front substrate 111 has long sides and short sides.

The rear substrate 112 is a layer disposed opposite to the front substrate ill for protecting the solar cell 119 at the side opposite to the front substrate 111. It is necessary for the rear substrate 112 to exhibit high vapor interception and insulation. Preferably, the rear substrate 112 is made of a highly reflective material by which solar light incident upon the front substrate 111 is reflected and used. The rear substrate 112 may be made of a transparent material upon which solar light is incident. The rear substrate 112 includes a front surface 112a disposed facing the solar cell 119 and a rear surface 112b opposite to the front surface 112a, the rear surface 112b being exposed to the outside.

The rear substrate 112 corresponds to the front substrate 111. Therefore, the rear substrate 112 may be formed or substantially formed in a rectangular shape. That is, the rear substrate 112 has long sides and short sides.

Encapsulants 113 and 114 are layers for sealing the solar cell 119 disposed between the front substrate 111 and the rear substrate 112. The encapsulants 113 and 114 intercept moisture or oxygen for preventing the solar cell 119 from being adversely affected. Preferably, the encapsulants 113 and 114 are made of a material exhibiting high deterioration resistance to hydrolysis or ultraviolet rays and a high incidence rate of solar light. Also preferably, the encapsulants 113 and 114 exhibit high hydrolysis resistance, high transparency, high weather resistance, high temperature resistance, light weight, and minimum change of dimensions due to heat.

The encapsulants 113 and 114 may be made of ethylene vinyl acetate (EVA) copolymer resin, polyvinyl butyral, partially oxidized EVA, silicon resin, ester resin, or olefin resin. In this embodiment, the encapsulants 113 and 114 are made of an EVA film.

The encapsulants 113 and 114 are provided to seal opposite main surfaces of the solar cell 119. The first encapsulant 113 is disposed between the solar cell 119 and the front substrate 111, and the second encapsulant 114 is disposed between the solar cell 119 and the rear substrate 112. In this embodiment, the first encapsulant 113 may be attached to the back surface 111b of the front substrate 111, and the second encapsulant 114 may be attached to the front surface 112a of the rear substrate 112.

In the above description, the solar cell 119 of the photovoltaic panel 110 is a crystalline silicon solar cell. In other embodiments, however, the solar cell 119 may be an amorphous silicon (a-Si) solar cell, a microcrystalline silicon (c-Si) solar cell, a compound semiconductor solar cell, a tandem solar cell, a copper indium gallium selenium (CIGS) solar cell, a cadmium telluride (CdTe) solar cell, a dye-sensitized solar cell, or an organic solar cell.

The frame 150 surrounds the edge of the photovoltaic panel 110, which may be formed or substantially formed in a rectangular shape. In this embodiment, the frame 150 surrounds the edge of the front substrate 111 and the edge of the rear substrate 112. The frame 150 may be formed or substantially formed in a rectangular shape so that the frame 150 corresponds to the front substrate 111 and the rear substrate 112, both of which may be formed or substantially formed in a rectangular shape. The frame 150 is coupled to a support stand (not shown), which supports the photovoltaic module at a ground or an installation place, for supporting the photovoltaic panel 110.

The frame 150 covers the edge of the light receiving surface 111a of the front substrate 111 and/or the edge of the rear surface 112b of the rear substrate 112. Also, the frame 150 covers the side of the front substrate 111 and the side of the rear substrate 112.

The photovoltaic panel 110 is fitted in the frame 150 so that the photovoltaic panel 110 is coupled to the frame 150. That is, the front substrate 111 and the rear substrate 112 are fitted in the frame 150 so that the front substrate 111 and the rear substrate 112 are coupled to the frame 150.

The frame 150 may be formed or substantially formed in a rectangular shape so that the frame 150 corresponds to the photovoltaic panel 110, which may be formed or substantially formed in a rectangular shape. That is, the frame 150 has long sides and short sides.

The frame 150 has at least one opening 150a (see FIG. 1, for example). The opening 150a is a passage through which rainwater or waste matter, which is collected at the light receiving surface 111a of the front substrate 111 or the rear surface 112b of the rear substrate 112 of the photovoltaic panel 110, is discharged to the outside.

Preferably, the opening 150a is formed at one side (the bottom side), which is near the ground, of the long and short sides of the frame 150. In the photovoltaic module, one of the short sides of the frame 150 may be the bottom side of the frame 150. Preferably, therefore, the opening 150a is formed at one of the short sides of the frame 150.

Preferably, the opening 150a is formed at a portion of the frame 150 at which the frame 150 covers the light receiving surface 111a of the front substrate 111 or the rear surface 112b of the rear substrate 112.

The opening 150a will be described hereinafter in more detail.

Figure 3:
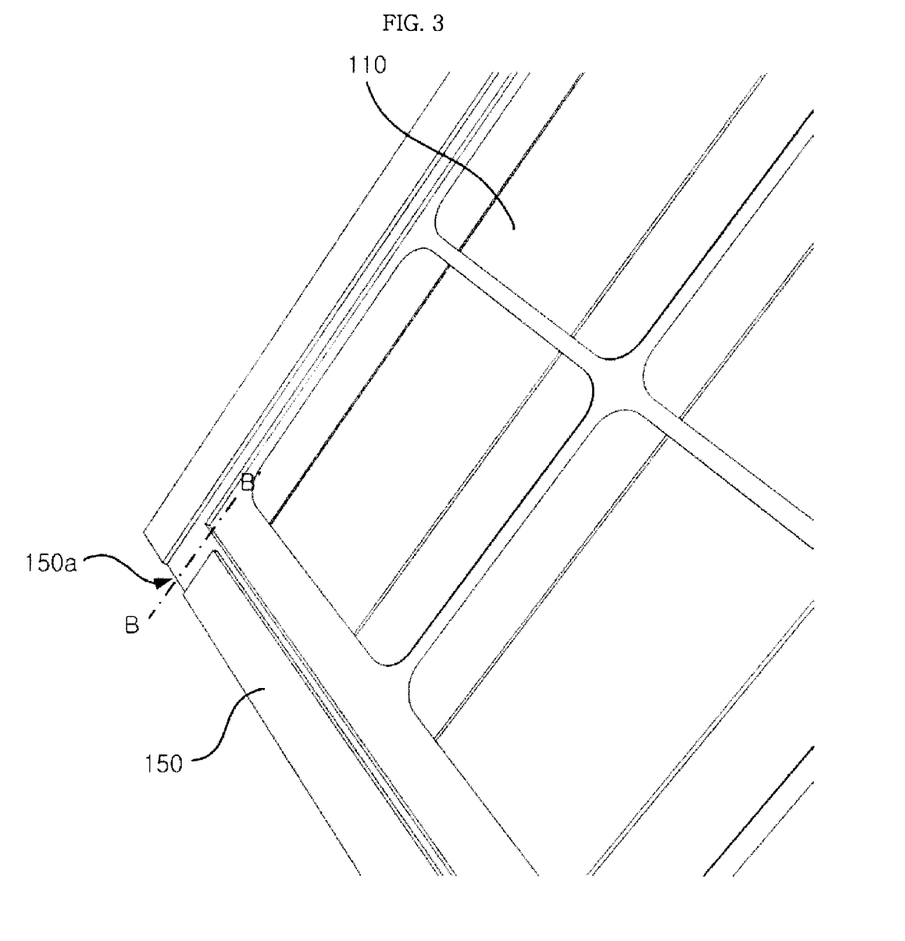
FIG. 3 is a partially enlarged view of the photovoltaic module according to the embodiment of the present invention shown in FIG. 1.
Figure 4:
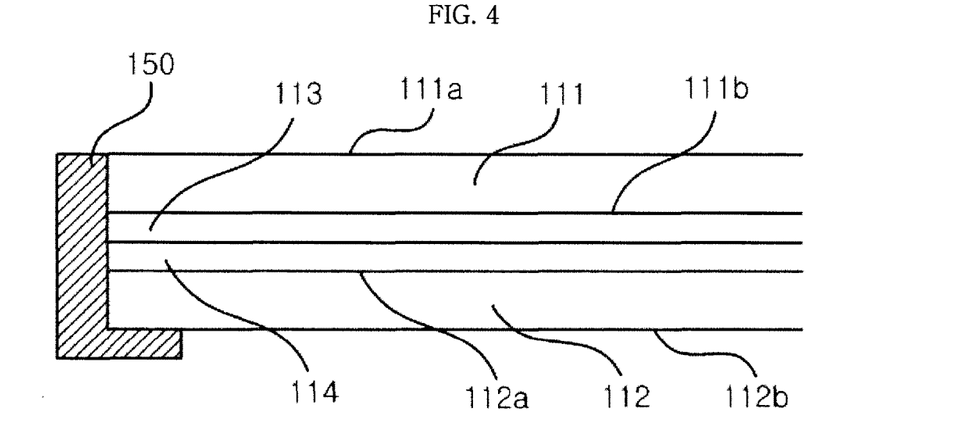
FIG. 4 is a sectional view taken along line B-B' of FIG. 3.
Figure 5:
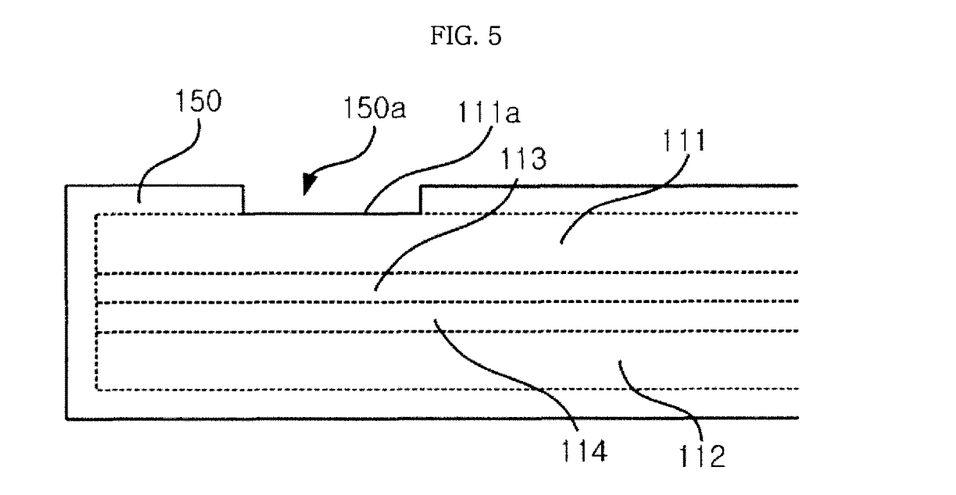
FIG. 5 is a partial side view of the photovoltaic module according to the embodiment of the present invention shown in FIG. 1 when viewed in a B direction of FIG. 3.

FIG. 3 is a partially enlarged view of the photovoltaic module according to the embodiment of the present invention shown in FIG. 1, FIG. 4 is a sectional view taken along line B-B' of FIG. 3, and FIG. 5 is a partial side view of the photovoltaic module according to the embodiment of the present invention shown in FIG. 1 when viewed in a B direction of FIG. 3.

In the photovoltaic module according to this embodiment of the present invention, two openings 150a are formed at opposite ends of one of the short sides of the frame 150. Specifically, the openings 150a are formed at a cover part of the frame 150 at which the frame 150 covers the light receiving surface 111a of the front substrate 111. In other embodiments, the openings 150 may be formed at a cover part of the frame 150 at which the frame 150 covers the rear surface 112b of the rear substrate 112.

Preferably, the openings 150a are formed by partially exposing the cover part of the frame 150 at which the frame 150 covers the light receiving surface 111a of the front substrate 111. As shown in FIGS. 4 and 5, the openings 150a are formed so that portions of the frame 150 are parallel to the light receiving surface 111a of the front substrate 111. That is, the openings 150a are formed so that portions of a cover part of the frame 150 at which the frame 150 covers the side of the front substrate 111 are parallel to the light receiving surface 111a of the front substrate 111. Portions of the edge of the light receiving surface 111a of the front substrate 111 at which the openings 150a are formed are exposed to the outside.

Preferably, two openings 150a are formed at opposite ends, i.e. parts which are the most adjacent to the corresponding long sides of the frame 150, of one of the short sides of the frame 150.

The width of each of the openings 150a may be different based on the kind or size of the photovoltaic module. Preferably, each of the openings 150a has a width of 0.5 cm to 3 cm.

Figure 6:
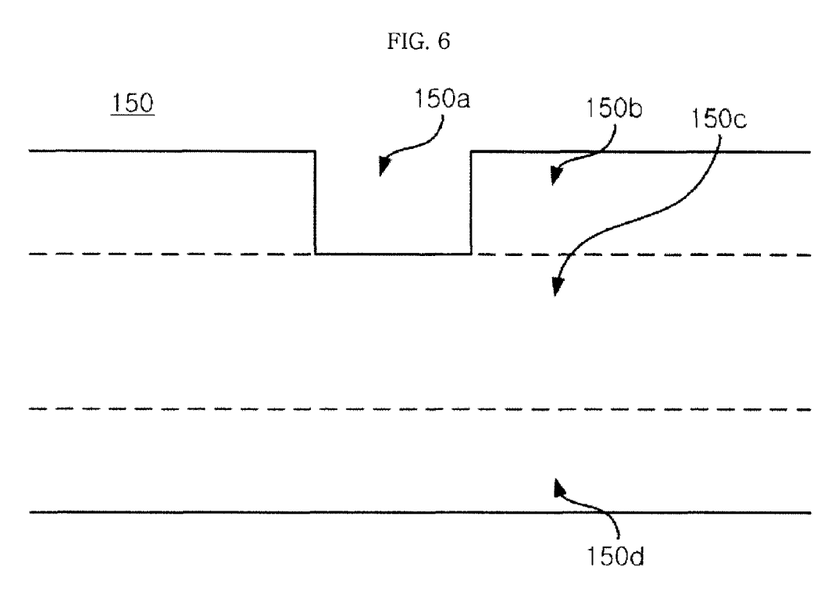
FIG. 6 is a partial development view illustrating a frame of the photovoltaic module according to the embodiment of the present invention shown in FIG. 1.

FIG. 6 is a partial development view illustrating the frame of the photovoltaic module according to the embodiment of the present invention shown in FIG. 1.

The frame 150 includes a light receiving surface contact part 150b for covering the light receiving surface 111a of the front substrate 111 and a side contact part 150c for covering the side of the front substrate 111 and the side of the rear substrate 112, and a rear contact part 150d for covering the rear surface 112b of the rear substrate 112.

Preferably, the opening 150a is formed by trimming a portion of the light receiving surface contact part 150b of the frame 150. Trimming is cutting a portion of an article produced by press or casting, for example.

In other embodiments, the opening 150a may be formed by trimming a portion of the rear contact part 150d of the frame 150.

Figure 7:
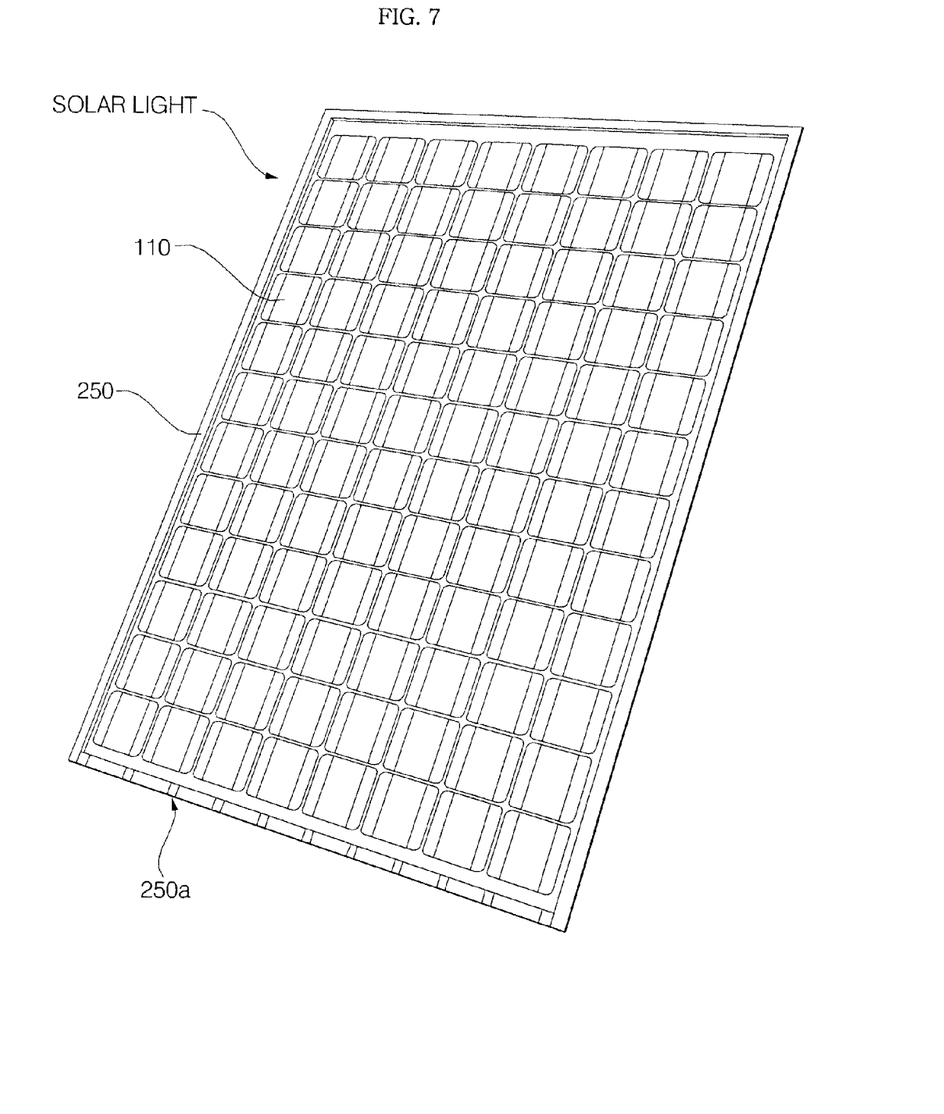
FIG. 7 is a perspective view illustrating a photovoltaic module according to another embodiment of the present invention.

FIG. 7 is a perspective view illustrating a photovoltaic module according to another embodiment of the present invention.

The photovoltaic module according to this embodiment of the present invention includes a plurality of openings 250a formed at a short side of a frame 250. Preferably, the openings 250a are formed at a cover part of the frame 250 at which the frame 250 covers the light receiving surface 111a of the front substrate 111. In other embodiments, the openings 250a may be formed at a cover part of the frame 250 at which the frame 250 covers the rear surface 112b of the rear substrate 112.

Rainwater or waste matter may be more easily discharged when a plurality of openings 250a is formed at the lower part of the frame 250 than when two openings are formed at opposite ends of the lower part of the frame 250. In this case, however, the strength of the frame 250 at the lower part thereof may be weakened.

The openings 250a may be arranged at regular intervals. In other embodiments, the openings 250a may be arranged at irregular intervals.

Figure 8:
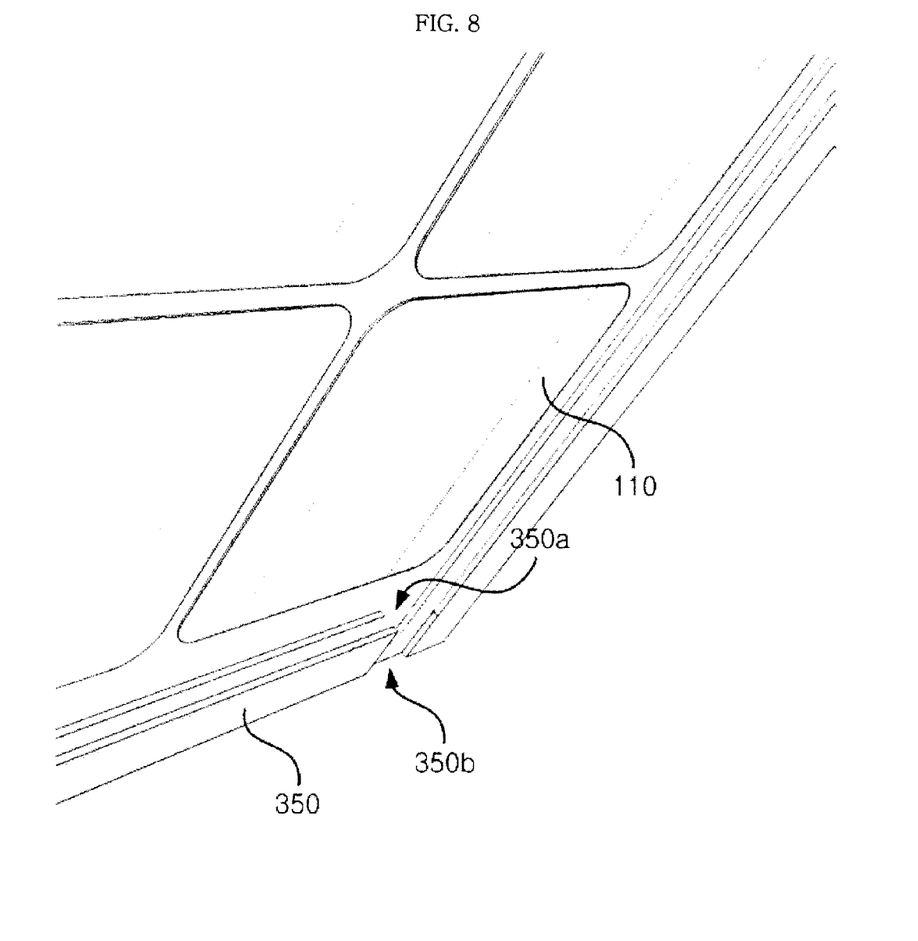
FIG. 8 is a partially see-through perspective view illustrating a photovoltaic module according to another embodiment of the present invention.

FIG. 8 is a partially see-through perspective view illustrating a photovoltaic module according to another embodiment of the present invention.

FIG. 8 illustrates the photovoltaic module when viewed from the back surface of the photovoltaic panel 110. In the photovoltaic module according to this embodiment of the present invention, an opening 350b is formed at a cover part of a frame 350 at which the frame 350 covers the rear surface 112b of the rear substrate 112. In this case, the opening 350b is formed at a short side of the frame 350. Also, the opening 350b is formed so that a portion of the frame 350 is parallel to the rear surface 112b of the rear substrate 112. A portion of the edge of the rear surface 112b of the rear substrate 112 at which the opening 350b is formed is exposed to the outside.

An opening 350a may be formed at a cover part of the frame 350 at which the frame 350 covers the light receiving surface 111a of the front substrate 111. In this case, the openings 350a and 350b are preferably formed in a symmetrical fashion in which the photovoltaic panel 110 is disposed between the openings 350a and 350b. In other embodiments, the openings 350a and 350b may not be formed in a symmetrical fashion.

In other embodiments, the opening 350a is not formed at the cover part of the frame 350 at which the frame 350 covers the light receiving surface 111a of the front substrate 111 but only at the cover part of the frame 350 at which the frame 350 covers the rear surface 112b of the rear substrate 112. Alternatively, the opening 350b is not formed at the cover part of the frame 350 at which the frame 350 covers the rear surface 112b of the rear substrate 112 but only at the cover part of the frame 350 at which the frame 350 covers the light receiving surface 111a of the front substrate 111.

Figure 9:
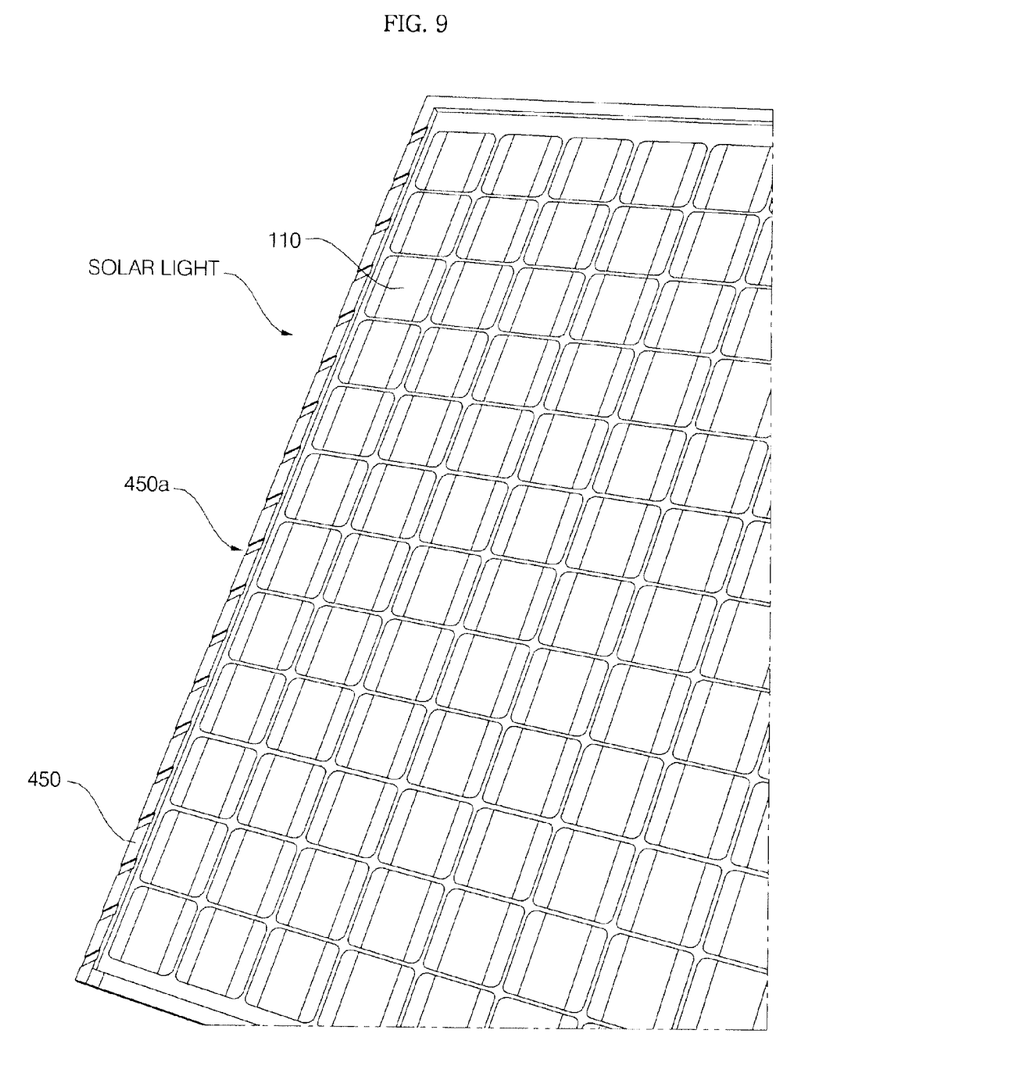
FIG. 9 is a perspective view illustrating a photovoltaic module according to another embodiment of the present invention.

FIG. 9 is a perspective view illustrating a photovoltaic module according to another embodiment of the present invention.

In the photovoltaic module according to this embodiment of the present invention, an opening 450a is formed at a long side of a frame 450 in an inclined fashion. In this case, the opening 450a is formed at a cover part of the frame 450 at which the frame 450 covers the light receiving surface 111a of the front substrate 111. In other embodiments, the opening 450a may be formed at a cover part of the frame 350 at which the frame 450 covers the rear surface 112b of the rear substrate 112. Alternatively, the opening 450a may be formed at the light receiving surface 111a of the front substrate 111 and the rear surface 112b of the rear substrate 112 in a symmetrical fashion or in a non-symmetrical fashion.

Preferably, the opening 450a is inclined at a predetermined angle. For example, the opening 450a may be inclined at an angle θ of less than 90 degrees with respect to a short side of the frame 450.

Preferably, the opening 450a is inclined toward the ground from the inside of the frame 450, which corresponds to the middle of the photovoltaic panel 110, to the outside of the frame 450 so that rainwater or waste matter is easily discharged through the opening 450a.

Preferably, a plurality of openings 450a is formed at the cover part of the frame 450 at which the frame 450 covers the light receiving surface 111a of the front substrate 111. The openings 450a may be arranged at regular intervals. In other embodiments, the openings 450a may be arranged at irregular intervals.

Figure 10:
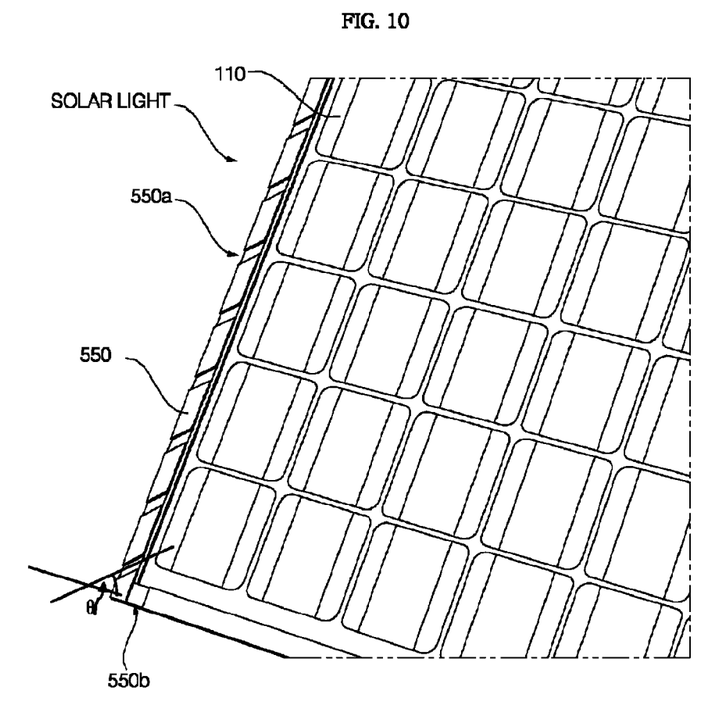
FIG. 10 is a perspective view illustrating a photovoltaic module according to another embodiment of the present invention.

FIG. 10 is a perspective view illustrating a photovoltaic module according to a further embodiment of the present invention.

In the photovoltaic module according to this embodiment of the present invention, openings 550a and 550b are formed at a long side and a short side of a frame 450, respectively. In this case, the openings 550a formed at the long side of the frame 550 are preferably inclined.

The openings 550a and 550b are formed at a cover part of the frame 550 at which the frame 550 covers the light receiving surface 111a of the front substrate 111. In other embodiments, the openings 550a and 550b may be formed at a cover part of the frame 550 at which the frame 550 covers the rear surface 112b of the rear substrate 112. Alternatively, the openings 550a and 550b may be formed at the light receiving surface 111a of the front substrate 111 and the rear surface 112b of the rear substrate 112 in a symmetrical fashion or in a non-symmetrical fashion.

Although the preferred embodiments of the present invention have been disclosed for illustrative purposes, those skilled in the art will appreciate that various modifications, additions and substitutions are possible without departing from the scope and spirit of the invention.

As is apparent from the above description, the photovoltaic module according to the embodiments of the present invention may have one or more of the following effects.

First, the photovoltaic module may have the effect of efficiently discharging rainwater or waste matter.

Second, the photovoltaic module may have the effect of providing an opening, through which rainwater or waste matter is discharged, formed through a simple process.

Third, the photovoltaic module may have the effect of providing an opening, through which rainwater or waste matter is discharged, while minimizing the decrease of strength of a frame.

Other effects that have not been mentioned above may become evident to those skilled in the art from the accompanying claims.

What is claimed is:

1. A photovoltaic module comprising:
a front substrate;
a rear substrate opposite to the front substrate;
a solar cell between the front substrate and the rear substrate; and
a frame surrounding edges of the front substrate and the rear substrate, the frame having a rectangular shape including a first short side, a second short side opposite to the first short side, a first long side connecting one end of each of the first and the second short sides, and a second long side connecting another end of each of the first and the second short sides and opposite to the first long side,
wherein the frame further includes a plurality of openings having at least one first opening at the first short side and at least one second opening by at least one of the first and the second long sides,
wherein the at least one second opening is angled from an outside edge of the frame to an inside edge of the frame,
wherein the plurality of openings are at a cover part of the frame at which the frame covers a front surface of the front substrate and a rear surface of the rear substrate,
wherein the at least one second opening includes a first side and a second side opposing each other and extending parallel to each other and angled with respect to the first and the second short sides, and
wherein each of the first side and the second side extends from a first position at the outside edge of the frame to a second position at the inside edge of the frame that is closer to the second short side than the first position.

2. The photovoltaic module according to claim 1, wherein the plurality of openings are formed by uncovering portions of the cover part.

3. The photovoltaic module according to claim 1, wherein the plurality of openings are formed so that portions of the frame are parallel to the front surface of the front substrate and the rear surface of the rear substrate.

4. The photovoltaic module according to claim 1, wherein portions of an edge of the front surface of the front substrate and the rear surface of the rear substrate at which the plurality of openings are exposed outside.

5. The photovoltaic module according to claim 1, wherein the at least one first opening comprises a plurality of first openings at opposite ends of the first short side of the frame.

6. The photovoltaic module according to claim 5, wherein the at least one first opening comprises two first openings at parts of the first short side of the frame which are adjacent to the first and the second long sides of the frame.

7. The photovoltaic module according to claim 1, wherein the at least one first opening comprises a plurality of first openings at the first short side of the frame.

8. The photovoltaic module according to claim 7, wherein the plurality of first openings are at the first short side of the frame at regular intervals.

9. The photovoltaic module according to claim 7, wherein the plurality of first openings are at the first short side of the frame at irregular intervals.

10. The photovoltaic module according to claim 1, wherein the at least one second opening comprises a plurality of second openings at the first and the second long sides of the frame at regular intervals.

11. The photovoltaic module according to claim 1, wherein the at least one second opening comprises a plurality of second openings at the first and the second long sides of the frame at irregular intervals.

12. The photovoltaic module according to claim 1, wherein the at least one second opening is at an angle of less than 90 degrees with respect to the first short side of the frame.

13. The photovoltaic module according to claim 1, wherein the plurality of openings are symmetrical.

14. The photovoltaic module according to claim 1, further comprising: a first encapsulant between the solar cell and the front substrate; and a second encapsulant between the solar cell and the rear substrate.

15. A photovoltaic module comprising:
a front substrate;
a rear substrate opposite to the front substrate;
a solar cell between the front substrate and the rear substrate; and
a frame surrounding edges of the front substrate and the rear substrate, the frame having a rectangular shape, including a first short side, a second short side opposite to the first short side, a first long side connecting one end of each of the first and the second short sides, and a second long side connecting another end of each of the first and the second short sides and opposite to the first long side,
wherein at least one opening is by at least one of the first and the second long sides and is angled from an outside edge of the frame to an inside edge of the frame, and
wherein the at least one opening is at a cover part of the frame at which the frame covers a front surface of the front substrate and a rear surface of the rear substrate,
wherein the at least one opening includes a first side and a second side opposing each other and extending parallel to each other and angled with respect to the first and the second short sides, and
wherein each of the first opening side and the second opening side extends from a first position at the outside edge of the frame to a second position at the inside edge of the frame that is closer to the second short side than the first position.

16. The photovoltaic module according to claim 15, wherein the at least one opening is partially formed at the cover part of the frame so that the frame entirely covers side surfaces of the front substrate and the rear substrate.

* * * * *